United States Patent Office 3,525,744
Patented Aug. 25, 1970

3,525,744
N-(FLUOROACETYLAMINO-TRICHLORO-
METHYL)-METHYL AMINES
Christa Fest, Wuppertal-Elberfeld, and Gunther Hermann, Leverkusen, Germany, assignors to Farbenfabriken Bayer Aktiengesellschaft, Leverkusen, Germany, a corporation of Germany
No Drawing. Continuation of application Ser. No. 502,318, Oct. 22, 1965. This application Apr. 9, 1969, Ser. No. 816,171
Claims priority, application Germany, Oct. 29, 1964, F 44,338
Int. Cl. C07d 87/42
U.S. Cl. 260—247.2      11 Claims

ABSTRACT OF THE DISCLOSURE

N-(fluoroacetylamino - trichloromethyl) - methyl amine having the general formula

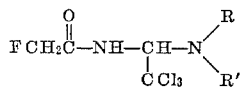

in which R and R', each respectively, is hydrogen, alkyl, aryl having 6–10 ring carbon atoms, or such alkyl or aryl which are substituted with at least one of halo, nitro, cyano, and/or lower alkoxy, R and R' when taken together with N forming a heterocyclic ring having 5–6 ring members such as piperidino, pyrrolidino, and morpholino, which possess rodenticidal properties, as well as compositions thereof with dispersible carrier vehicles and methods of using such compounds to combat rodents, such compounds being prepared by conventional methods.

This is a streamlined continuation application of copending U.S. application Ser. No. 502,318, filed Oct. 22, 1965, now abandoned.

The present invention relates to particular new fluoroacetylated aminals, which have rodenticidal properties, to compositions thereof with dispersible carrier vehicles, as well as to the production and use thereof.

It is known that sodium monofluoroacetate, monofluoroacetamide, 1,2,3,4,10,10-hexachloro-exo-6,7-epoxy-1,4,4a,5,6,7,8,8a-octahydro - 1,4,5,8 - endo,endo-dimethane-naphthalene, chlorinated camphene and 2-chloro-4-methyl-6-dimethylamino-pyrimidine can be used for combating short-tailed mice. These rodenticides have already achieved considerable practical importance. All these active compounds have, in common, that they are not only active against short-tailed mice but are also highly toxic towards other animals. Combating short-tailed mice with these active compounds thus also endangers domestic mammals such as cats and dogs as well as birds.

It is an object of the present invention to provide particular new fluoroacetylated aminal compounds which possess valuable rodenticidal properties, especially regarding short-tailed mice, to provide active compositions in the form of mixtures of such compounds with solid and liquid dispersible carrier vehicles, to provide a process for producing such compounds, and to provide methods of using such compounds in a new way, especially for combatting short-tailed mice.

Other and further objects of the present invention will become apparent from a study of the within specification and accompanying examples.

It has now been found in accordance with the present invention that particular new fluoroacetylated aminals, or N-(fluoroacetylamino-trichloromethyl)-methyl-amines, or N-1-(1-fluoroacetylamino-2-trichloro) - ethyl- N-lower alkyl-amines or -N-lower alkyl-N-phenylamines or -cyclic amines, having the general formula

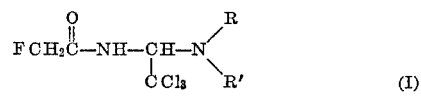

in which R and R' each respectively is selected from the group consisting of hydrogen, alkyl, aryl having from 6 to 10 ring carbon atoms, and such alkyl and such aryl which are substituted with at least one member selected from the group consisting of halo, nitro, cyano, lower alkoxy, and mixtures thereof, said R and R' when taken together with N forming a heterocyclic ring having 5 to 6 ring members, have strong rodenticidal properties and can be used effectively for combating short-tailed mice.

The aminals of general Formula I are obtained when fluoroacetylamino-trichloromethyl - chloromethane of the formula

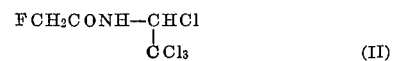

is reacted wtih amines of the general formula

in which R and R' have the same meaning as defined above, in the presence of acid binding agents.

As will be appreciated by the artisan, the compounds used as starting materials are all known.

It is very surprising that, in contrast to the previously known rodenticides, the particular new aminals according to the present invention have a markedly high toxicity towards short-tailed mice but a significantly low toxicity towards other animals, for example towards other rodents, such as white mice and white rats.

The process according to the present invention can be illustrated by the following typical equation when fluoroacylamino-trichloromethyl-chloromethane is reacted with morpholine:

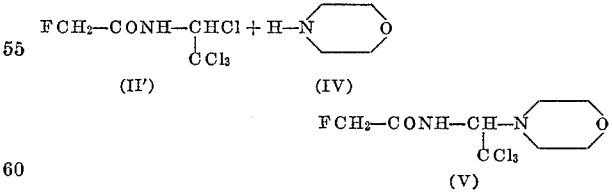

The reaction according to the present invention can be carried out in the presence of typical inert diluents. Hydrocarbons, chlorinated hydrocarbons and ethers, such as ether (i.e., diethyl ether) and dioxan, are suitable for this purpose.

All conventional acid binding agents can be used as acid binders herein. These mainly include tertiary amines, such as trimethylamine and pyridine, as well as the conventional inorganic acid binders. Advantageously, the amines used as reaction component can also be employed as acid binders.

The reaction temperature may be varied within a fairly wide range and is generally substantially between about 0 and 100° C.

To carry out the process according to the present invention, the reaction components are reacted with one another in approximately equimolecular proportions. Since the reaction is strongly exothermic, cooling is advisable. Working up of the reaction mixture is carried out in the usual manner, mainly by separating the acid binding agent and concentrating the reaction mixture.

The particular new compounds according to the present invention have selective rodenticidal properties and are, therefore, suitable for combating noxious short-tailed mice (*Microtinae*). These include, for example, the common vole (*Microtus arvalis*), the field vole (*Microtus agrestis*), the water vole (*Arvicola terrestris*) and the musk rat (*Ondatra zibethica*).

Thus, the new compounds of the instant invention can be used as rodenticides either alone or in admixture with solid or liquid carriers or diluents.

The active compounds according to the instant invention can be utilized, if desired, in the form of the usual formulations or compositions with dispersible carrier vehicles, such as solutions emulsions, suspensions, emulsifiable concentrates, spray powders, pastes, soluble powder, dusting agents, granulates, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95%. by weight, and preferably 0.5 and 90% by weight, of the mixture, whereas carrier composition mixtures suitable for direct application or field application generally contemplate those in which the active compound is present in an amount substantially between about 0.002 and 20%, preferably 0.01 and 5%, by weight of the mixture. Thus, the present invention contemplates over-all compositions which comprises mixtures of a dispersible carrier vehicle such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.002 and 95% by weight of the mixture. Specifically, the active compound may be applied to a given area habitated by the short-tailed mice in concentrations substantially between about 10 and 250 mg. per square meter.

Furthermore, the present invention contemplates methods of selectively controlling or combating rodents, e.g. short-tailed mice, which comprises applying to at least one of (a) such mice and (b) their habitat, a rodenticidally effective amount of the particular active compound of the invention alone or together with a carrier vehicle as noted above. The instant formulations or compositions are applied in the usual manner, for example by spraying, atomizing, vaporizing, scattering, dusting, watering, sprinkling, and the like, especially by poisoning of rodent drinking water or by laying out above ground or under ground eating or playing baits or attractants in which the active compounds are incorporated, and also especially by fumigating rooms or subterranean burrows in which such rodents may be found or be likely to be found.

The following examples are given for the purpose of illustrating, while not limiting, the utility of the compounds according to the present invention.

EXAMPLE 1

Toxicity test oral application

Test animal:        Evaluation after—
 White laboratory mouse (*Mus musculus*) __ 3 days.
 White laboratory rat (*Rattus norvegious*) __ 7 days.
 Common vole (*Microtus arvalis*) _____ 3 days.

To produce a suitable preparation of the particular active compound, 3 parts by weight of such active compound are mixed with 2.8 parts by weight of highly dispersed silicic acid and 4.2 parts by weight of talc. From this concentrate of the given active compound there are prepared, by triturating with water and adding some powdered natural gum, suspensions which contain, in 1 ml. liquid, the amount of the particular active compound to be applied per 100 g. animal weight. Dosing is carried out volumetrically, after weighing the test animals, application being per os by means of a knobbed steel probe. Evaluation is carried out after the periods of time specified above, calculated from the start of the application of the active compound.

The $LD_{50}$ values (dose of active compound by which 50% of the treated test animals are destroyed) are determined in the usual manner from the mortality values of the doses varied in geometrical progression.

The active compounds, $LD_{50}$ values and test animals can be seen from Table 1 as follows.

3,525,744

TABLE 1
[Toxicity test/oral application]

| Active compound | LD₅₀ values (mg./kg. body weight) | | |
|---|---|---|---|
| | Albino rat | Albino mouse | Common vole |
| (A) Sodium monofluoroacetate | *5–7 | *8–10 | 5 |
| (B) Monofluoroacetamide | *15 | *6–10 | 15 |
| (C) 1,2,3,4,10,10-hexachloro-exo-6,7-epoxy-1,4,4a,5,6,7,8,8a-octahydro-1,4,5,8-endo, endo-dimethane-naphthalene | *7.3 | 8 | 8 |
| (D) Chlorinated camphene | *90–125 | *112 | *90 |
| (E) 2-chloro-4-methyl-6-dimethylamino-pyrimidine | *1–2 | *1–2 | 2 |
| (VI) FCH₂CONH—CH—NHCH₃<br>　　　　　　　　｜<br>　　　　　　　CCl₃ | 56 | 150 | 5 |
| (V′) FCH₂CONH—CH—N⟨O⟩<br>　　　　　　　　｜<br>　　　　　　　CCl₃ | 100 | 600 | 15 |
| (VII) FCH₂CONH—CH—NH—⟨Cl⟩<br>　　　　　　　　｜<br>　　　　　　　CCl₃ | 1,000 | >1,200 | 5 |
| (VIII) FCH₂CONH—CH—N(CH₃)₂<br>　　　　　　　　｜<br>　　　　　　　CCl₃ | 50 | 450 | 3.75 |

*The figures in the table marked with asterisks are taken from publications.

EXAMPLE 2

Poisoned area test

Test animal: common vole (*Microtus arvalis*). Wettable powder base consisting of: 3% sodium diisobutylnaphthalene-1-sulfonate; 6% sulfite waste liquor, partially condensed with aniline; 40% highly dispersed silicic acid containing calcium oxide; and 51% colloidal kaolin.

To produce a suitable preparation of the particular active compound, 1 part by weight of such active compound is intimately mixed with 19 parts by weight of the wettable powder base. The spray powder thus obtained is suspended in water and the suspension diluted to the desired final concentration. 200 ml. of the suspension contain the amount of such active compound to be applied per square meter.

20 ml. of the suspension of the given active compound are sprayed on a circular area of 1000 sq. cm. in which a 20 x 29 cm. sod is placed. Immediately afterwards, the sod is transferred to a wired metal cage and 4 mature common voles are placed on it. The degree of destruction is determined percentagewise after 3 days.

The active compound, the amounts applied (mg./sq. m.) and the degree of destruction can be seen from Table 2 as follows:

TABLE 2
[Poisoned area test]

| Active compound | Destruction in Percent with quantities of— | | |
|---|---|---|---|
| | 100 mg./sq.m. | 50 mg./sq.m. | 20 mg./sq.m. |
| (VI′) FCH₂CONH—CH—NHCH₃<br>　　　　　　　　｜<br>　　　　　　　CCl₃ | 100 | 100 | |

EXAMPLE 3

Poisoned wheat test/mice

Test animal: common vole (*Microtus arvalis*). Solvent: acetone.

To produce a suitable preparation of the particular active compound, such active compound is dissolved in the solvent stated above in an amount sufficient to obtain the desired concentration of the active compound in the poisoned wheat when 26.6 g. of this solution are carefully mixed with 1 kg. of wheat seed and the solvent is allowed to evaporate.

Ten grains of the wheat thus treated are offered to each of 4 hungry test animals which are kept separately. An ample amount of water is also available. After 24 hours, the animals are again fed normally.

The degree of destruction of the test animals is determined percentagewise within 7 days after application.

The active compound, its concentration, the degree of destruction and the period of time required for destruction can be seen from the following Table 3.

TABLE 3
[Poisoned wheat test/mice]

| Active compound | Concentration of active compound in percent | Degree of destruction in percent | Time required for destruction, days |
|---|---|---|---|
| (VI″) FCH₂CONH—CH—NHCH₃<br>　　　　　　　　｜<br>　　　　　　　CCl₃ | 0.25 | 100 | 1 |

EXAMPLE 4

Toxicity test microtinae

Test animal: water vole (*Arvicola terrestris*). Solvent: acetone.

To produce a suitable composition of the particular active compound, there is prepared a solution of the given active compound in the solvent stated above, which contains, in 0.1 ml. liquid, the amount of active compound to be applied per 100 g. of animal weight. After weighing the test animals, dosing is carried out volumetrically by applying the amount of solvent required for a specific animal by means of a micropipette to a small piece of apple. When the solvent has evaporated, the poisoned baits are offered to two hungry test animals which are kept separately. When the piece of apple has been eaten, the animals are normally fed and supplied with water. The degree of destruction is determined percentagewise within 7 days after application.

The active compound, the amount applied per test animal (mg./kg.), the degree of destruction and the time required for destruction can be seen from the following Table 4.

TABLE 4
[Toxicity test/microtinae]

| Active compound | Amount of active compound per test animal mg./kg. | Degree of destruction, percent | Time required for destruction, days |
|---|---|---|---|
| (VI''')FCH₂CONH—CH—NHCH₃<br>    \|<br>    CCl₃ | 10 | 100 | 1 |

The following examples are given for the purpose of illustrating, while not limiting, the preparation of typical new compounds according to the present invention.

EXAMPLE 5

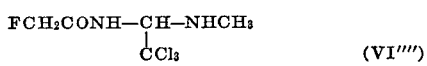
(VI'''')

24 grams (1/10 mol) of fluoroacetylamino-trichloromethylchloromethane are dissolved in 100 cc. of ether, and 6.2 g. (2/10 mol) of monomethylamine are added dropwise. The reaction is strongly exothermic, cooling with ice/methanol being necessary. The reaction mixture is further stirred at room temperature for 1 to 2 hours, then filtered off with suction from attendant monomethylamine hydrochloride. The resulting ethereal solution is evaporated and the substance recrystallized from ligroin. M.P. 72° C. Yield 16 g. (66% of the theroretical) of N-1-(1-fluoroacetylamino-2-trichloro)-ethyl-N-methylamine.

The following compounds are prepared in an analogous manner:

N-1-(1-fluoroacetylamino-2-trichloro) - ethyl - morpholine having the formula

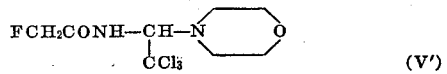
(V')

M.P. 90° C., recrystallized from alcohol; yield 20% of the theoretical;

N-1-(1-fluoroacetylamino-2-trichloro)ethyl - piperidine having the formula

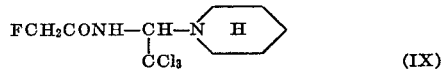
(IX)

M.P. 64° C., recrystallized from ligroin; yield 63% of the theoretical;

N-1-(1-fluoroacetylamino - 2 - trichloro)ethyl-N-3'-chlorophenylamine having the formula

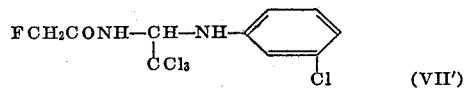
(VII')

M.P. 95° C., recrystallized from ligroin; yield 65% of the theoretical;

N-1-(1-fluoroacetylamino - 2 - trichloro)ethyl-N,N-dimethylamine having the formula

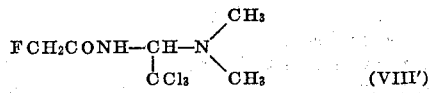
(VIII')

M.P. 48° C., recrystallized from ligroin; yield 48% of the theoretical;

N-1-(1-fluoroacetylamino - 2 - trichloro)ethyl-N-phenylamine having the formula

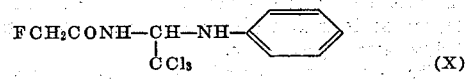
(X)

M.P. 112° C., recrystallized from cyclohexane; yield 34% of the theoretical; and N-1-(1-fluoroacetylamino - 2 - trichloro)ethyl-N-2',4',5'-trichlorophenylamine having the formula

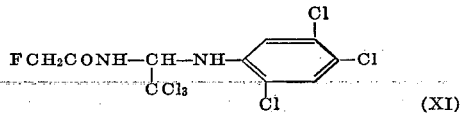
(XI)

M.P. 83° C., recrystallized from ligroin; yield 25% of the theoretical.

In the same way, using corresponding molar amounts of fluoroacetylamino-trichloromethyl-chloromethane and, respectively: ammonia, secondary butyl-phenylamine, diphenylamine, 2-chloroethylamine, fluoromethyl - 1'-bromoethylethylamine (i.e. fluoromethyl-bromo-iso-propylamine), 2,4-dichlorophenyl-4'-chlorophenyl-amine, 4-nitro-n-butylamine, 2 - cyanoethyl-4'-cyanophenyl-amine, 3-isobutoxy-phenylamine, methoxy-methyl - 2' - nitro-3'-cyanophenyl-amine, 4 - chloro-piperidine, 3-ethoxy-pyrrolidone, and tert.-butyl - 2' - bromo-3'-chloro-5'-fluoro-6'-nitro-naphthyl-(1')-amine, the following acetylated aminals are produced:

N-1-(1-fluoro-acetyl-amino - 2 - trichloro)ethyl- -(dihydro-amine, -N-sec.-butyl - N - phenyl-amine, -N,N-diphenyl-amine, -N - 2' - chloro-ethyl-amine, -N-fluoromethyl - N - 1' - bromo-methyl-ethyl-amine, -N-2'-4'-dichlorophenyl - N - 4" - chlorophenyl-amine, -N-4'-nitro-N-butyl-amine, -N-2'-cyanoethyl - N - 4" - cyanophenyl-amine, -N - 3' - isobutoxy-phenylamine, -N-methoxy-methyl - N 2' - nitro-3'-cyanophenyl-amine, -N-4'-chloro-piperidine, -N - 3' - ethoxy-pyrrolidone, and -N-tert.-butyl - N - 2' - bromo-3'-chloro-5'-fluoro-6'-nitro-naphthyl-(1')-amine.

It will be appreciated in accordance with the present invention that in connection with the foregoing formulae:

R and R' each respectively represents the same or different radicals selected from the group consisting of hydrogen; alkyl, such as methyl, ethyl, n-propyl, iso-propyl, n-butyl, iso-butyl, sec.-butyl, tert.-butyl, and the like, preferably lower alkyl, and especially alkyl having 1 to 4 carbon atoms in the alkyl chain; aryl having from 6 to 10 ring carbon atoms, such as phenyl, naphthyl, and the like, preferably phenyl; and such alkyl and such aryl (having from 6 to 10 ring carbon atoms) which are substituted with at least one member, e.g. 1–3 members selected from the group consisting of halo, such as chloro, bromo, fluoro and iodo, preferably chloro, bromo and fluoro, and especially chloro; nitro; cyano; lower alkoxy, such as methoxy, ethoxy, n-propoxy, iso-propoxy, n-butoxy, iso-butoxy, sec.-butoxy, tert.-butoxy, and the like, preferably alkoxy having 1 to 4 carbon atoms in the alkoxy chain; and mixtures of the foregoing;

said R and R' when taken together with N forming a heterocyclic ring having 5 to 6 ring members, such as piperidino, 4-chloropiperidino, pyrrolidino, 3-ethoxy-pyrrolidino, morpholino, 3-methyl-morpholino, and the like, preferably piperidino and morpholino, i.e. heterocyclic moieties having 5 to 6 ring members including nitrogen or nitrogen and oxygen as ring members, as well as substituents such as halo, especially chloro, and lower alkyl such as methyl, ethyl, and the like.

Preferably, N-1-(1-fluoroacetylamino - 2 - trichloro) ethyl-N-lower alkyl-amines having the formula

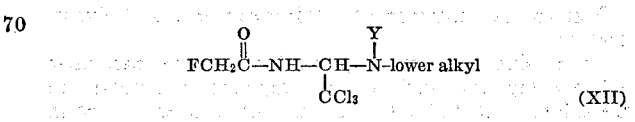
(XII)

in which Y is selected from the group consisting of hydrogen and lower alkyl; N-1-(1-fluoroacetylamino-2-trichloro)ethyl-N-phenyl-amines having the formula

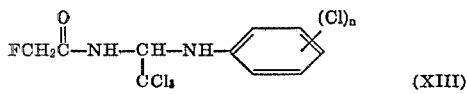
(XIII)

in which n is a number from 0 to 3; and N-1-(1-fluoroacetylamino-2-trichloro)ethyl-cyclic amines having the formula

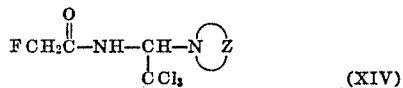
(XIV)

in which Z is a divalent cyclic chain radical selected from the group consisting of alkylene and alkoxyalkyl, i.e. oxyalkylene, each having 4 to 5 linkage atoms in the cyclic chain, are contemplated herein, especially those compounds in accordance with the present invention in which R and R' are lower alkyl and/or phenyl, and/or lower alkyl and/or phenyl which is substituted with chloro, bromo and/or fluoro, especially chloro, groups, and preferably where R and R' are taken together with N, the cyclicamine will be in the form of a heterocyclic moiety containing 5 to 6 ring members with nitrogen or nitrogen and oxygen as ring members, and especially piperidino, pyrrolidino and morpholino groups which are unsubstituted or substituted with halo, especially chloro, and lower alkyl, as aforesaid.

All of the foregoing compounds contemplated by the present invention possess the desired rodenticidal properties and low mammalian toxicity, and especially with respect to short-tailed mice, the instant compounds are versatile and extremely effective rodenticides while having a markedly low toxicity toward other animals such as domestic mammals and birds and even other rodents which may have commercial value, such as white mice and white rats.

It will be appreciated that the instant specification and examples are set forth by way of illustration and not limitation, and that various modifications and changes may be made without departing from the spirit and scope of the present invention.

What is claimed is:

1. N - (fluoroacetylamino - trichloromethyl) - methyl amine having the formula

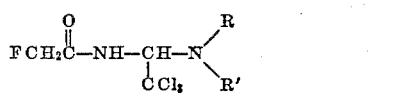

in which R and R' each respectively is selected from the group consisting of hydrogen, $C_{1-4}$ alkyl, phenyl, and phenyl which is substituted with 1-3 members selected from the group consisting of chloro, bromo and fluoro, said R and R' when taken together with N forming an unsubstituted member selected from the group consisting of piperidino, pyrrolidino and morpholino.

2. N - 1 - (1 - fluoroacetylamino - 2 - trichloro)ethyl-N-lower alkyl-amine having the formula

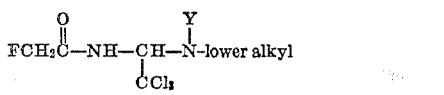

in which the lower alkyl moiety has 1-4 carbon atoms, and Y is selected from the group consisting of hydrogen and $C_{1-4}$ alkyl.

3. N - 1 - (1 - fluoroacetylamino - 2 - trichloro)ethyl-N-phenyl-amine having the formula

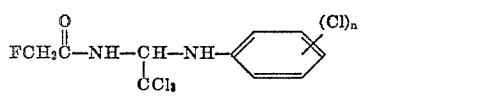

in which n is a number from 0 to 3.

4. N - 1 - (1 - fluoroacetylamino - 2 - trichloro)ethyl-cyclic amine having the formula

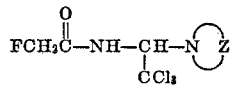

in which

is an unsubstituted member selected from the group consisting of piperidino, pyrrolidino and morpholino.

5. N - 1 - (1 - fluoroacetylamino - 2 - trichloro)ethyl-N-methyl-amine having the formula

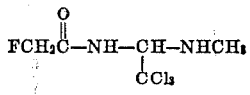

6. N - 1 - (1 - fluoroacetylamino - 2 - trichloro)ethyl-morpholine having the formula

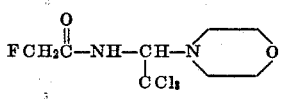

7. N-1-(1-fluoroacetylamino-2-trichloro)ethyl - peperidine having the formula

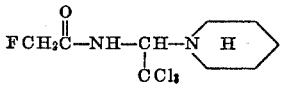

8. N - 1 - (1 - fluoroacetylamino - 2 - trichloro)ethyl-N-3'-chlorophenyl-amine having the formula

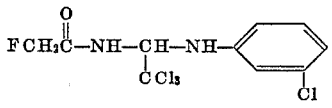

9. N - 1 - (1 - fluoroacetylamino - 2 - trichloro)ethyl-N,N-dimethylamine having the formula

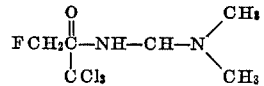

10. N - 1 - (1 - fluoroacetylamino - 2 - trichloro)ethyl-N-phenyl-amine having the formula

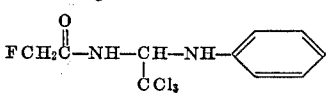

11. N - 1 - (1 - fluoroacetylamino - 2 - trichloro)ethyl-N-2',4',5'-trichlorophenyl-amine having the formula

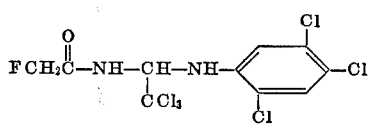

References Cited

UNITED STATES PATENTS 1,915,334   6/1933   Salzberg et al. _____ 260—243
2,075,359   3/1937   Salzberg et al. _____ 167—22

OTHER REFERENCES

Chemical Abstracts, vol. 59, p. 14, 515 (1963).
Pianka et al.: Chemical Abstracts, vol. 63, p. 14694e (1965).

ALEX MAZEL, Primary Examiner
J. TOVAR, Assistant Examiner

U.S. Cl. X.R.

260—294, 326.3; 561, 562; 424—248, 267, 274